US009172944B2

(12) United States Patent
Tajiri et al.

(10) Patent No.: US 9,172,944 B2
(45) Date of Patent: Oct. 27, 2015

(54) IMAGE PROCESSING DEVICE, IMAGE PROCESSING METHOD, NON-TRANSITORY TANGIBLE MEDIUM HAVING IMAGE PROCESSING PROGRAM, AND IMAGE-PICKUP DEVICE

(75) Inventors: Shinichiro Tajiri, Tokyo (JP); Hiroki Kikuchi, Kanagawa (JP); Seiji Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 923 days.

(21) Appl. No.: 13/112,160

(22) Filed: May 20, 2011

(65) Prior Publication Data

US 2011/0292183 A1     Dec. 1, 2011

(30) Foreign Application Priority Data

May 28, 2010   (JP) .................................. 2010-122254

(51) Int. Cl.
*H04N 13/02*     (2006.01)
*H04N 13/00*     (2006.01)
*H04N 13/04*     (2006.01)

(52) U.S. Cl.
CPC ......... *H04N 13/021* (2013.01); *H04N 13/0022* (2013.01); *H04N 13/0055* (2013.01); *H04N 13/0235* (2013.01); *H04N 13/0239* (2013.01); *H04N 13/0271* (2013.01); *H04N 13/0296* (2013.01); *H04N 13/0497* (2013.01)

(58) Field of Classification Search
CPC .......... H04N 13/0239; H04N 13/0055; H04N 13/0497; H04N 13/0296

USPC ..................................... 348/50, 46, 47, 51, 42
See application file for complete search history.

(56) References Cited

U.S. PATENT DOCUMENTS

| 5,726,704 | A | 3/1998 | Uomori | |
|---|---|---|---|---|
| 5,801,760 | A | 9/1998 | Uomori | |
| 5,963,664 | A * | 10/1999 | Kumar et al. | 382/154 |
| 7,567,703 | B2 * | 7/2009 | Jones et al. | 382/154 |
| 7,944,444 | B2 * | 5/2011 | Ha et al. | 345/427 |
| 8,654,194 | B2 * | 2/2014 | Imamura | 348/135 |
| 2008/0259201 | A1 * | 10/2008 | Iijima et al. | 348/345 |
| 2010/0194860 | A1 * | 8/2010 | Mentz et al. | 348/47 |

FOREIGN PATENT DOCUMENTS

| JP | 04-035491 | 2/1992 |
|---|---|---|
| JP | 7-167633 | 7/1995 |
| JP | 08-009421 | 1/1996 |
| JP | 08-317429 | 11/1996 |

(Continued)

OTHER PUBLICATIONS

Japanese Office Action issued Mar. 27, 2014 in corresponding Japanese Patent Application No. 2010-122254.

(Continued)

*Primary Examiner* — Shawn An
(74) *Attorney, Agent, or Firm* — K&L Gates LLP

(57) ABSTRACT

An image processing device includes: a parallax control processing section performing an image processing for modifying a parallax magnitude, on each of a plurality of parallax images obtained through shooting from a plurality of respective view point directions different from one another, with use of shooting information related to a shooting condition for each of the parallax images.

6 Claims, 15 Drawing Sheets

(56) References Cited

FOREIGN PATENT DOCUMENTS

| | | |
|---|---|---|
| JP | 2003-107601 | 4/2003 |
| JP | 2004-208211 | 7/2004 |

OTHER PUBLICATIONS

Japanese Office Action issued Jun. 30, 2015 in corresponding Japanese Patent Application No. 2014-208527.

* cited by examiner

G:DISTANCE BETWEEN CENTERS OF GRAVITY

IMAGE PROCESSING DEVICE, IMAGE PROCESSING METHOD, NON-TRANSITORY TANGIBLE MEDIUM HAVING IMAGE PROCESSING PROGRAM, AND IMAGE-PICKUP DEVICE

CROSS REFERENCES TO RELATED APPLICATIONS

The present disclosure claims priority to Japanese Priority Patent Application JP 2010-122254 filed in the Japan Patent Office on May 28, 2010, the entire content of which is hereby incorporated by reference.

BACKGROUND

The present disclosure relates to an image processing device, an image processing method, a non-transitory tangible medium having an image processing program, and an image-pickup device that perform a predetermined image processing on a plurality of parallax images that correspond to three-dimensional viewing.

In recent years, an image processing device that modifies (increases and decreases) a parallax magnitude between left and right parallax images (left parallax image and right parallax image) for three-dimensional viewing, for example, disclosed in Japanese Unexamined Patent Application Publication No. H07-167633 (H07-167633A) has been developed. The parallax magnitude is equivalent to degree of a position difference between left and right parallax images in the horizontal direction, and a stereoscopic effect becomes different depending on a magnitude of the parallax magnitude. H07-167633A performs an image processing in which a difference between left and right retina images (disparity), which is equivalent to a parallax magnitude between left and right parallax images, is detected to thereby modify the parallax magnitude by shifting the whole images in the horizontal direction based on the detected disparity (more specifically, an average of the disparity). A stereoscopic effect in displaying of an image can be modified by such a modification control of a parallax magnitude.

SUMMARY

However, in the image processing method of H07-167633A, there is no mechanism for determining an amount for parallax modification control, and the amount for modification control is fixed (to a constant amount) or adjusted manually by an observer (user). Here, a parallax magnitude is relatively large when a subject is shot with a telephoto condition and is relatively small when the subject is shot with a wide-angle condition. Similarly, the parallax magnitude differs when shooting a close subject and when shooting a far subject.

Accordingly, as conditions in shooting images or "shooting conditions" (such as a focal length) change in time-series by a so-called zooming operation, the parallax magnitude itself changes. Therefore, the following problem may occur when the parallax magnitude is modified by a constant control amount for each parallax image shot by the zooming operation for an animated image. Namely, when each modified parallax image is displayed in animated images, a stereoscopic effect changes during a motion (zooming operation), so that the images are displayed unnaturally.

It is desirable to provide an image processing device, an image processing method, a non-transitory tangible medium having an image processing program, and an image-pickup device, capable of controlling a parallax while maintaining a desired stereoscopic effect, in particular, in parallax images shot as animated images for three-dimensional viewing.

An image processing device according to an embodiment of the technology includes: a parallax control processing section performing an image processing for modifying a parallax magnitude, on each of a plurality of parallax images obtained through shooting from a plurality of respective view point directions different from one another, with use of shooting information related to a shooting condition for each of the parallax images.

An image processing method according to an embodiment of the technology includes: performing an image processing for modifying a parallax magnitude, on each of a plurality of parallax images obtained through shooting from a plurality of respective view point directions different from one another, with use of shooting information related to a shooting condition for each of the parallax images.

A non-transitory tangible medium according to an embodiment of the technology has a computer-readable image processing program embodied therein, in which the computer-readable image processing program is adapted to be executed to implement a method that includes: performing an image processing for modifying a parallax magnitude, on each of a plurality of parallax images obtained through shooting from a plurality of respective view point directions different from one another, with use of shooting information related to a shooting condition for each of the parallax images.

An image-pickup device according to an embodiment of the technology includes: an image-pickup lens; a shutter performing switching between a transmission mode and blocking mode, the transmission mode allowing light along each of a plurality of light paths to pass through the shutter and the blocking mode allowing the light along each of a plurality of light paths to be blocked by the shutter; an image-pickup element receiving transmission light along each of the light paths, and acquiring image-pickup data corresponding each of a plurality of parallax images obtained through shooting from a plurality of respective view point directions different from one another; and a parallax control processing section performing an image processing for modifying a parallax magnitude, on each of the parallax images, with use of shooting information representing a shooting condition for each of the parallax images.

In the image processing device, the image processing method, the non-transitory tangible medium having the image processing program, and the image-pickup device according to the embodiments of the technology, the parallax magnitude is modified for each of the plurality of parallax images with use of the shooting information related to the shooting condition for each of the parallax images. The parallax magnitude changes depending on the shooting condition such as a focal length. The shooting information is utilized so that, even when the shooting is performed by changing the shooting condition in time-series such as performing the shooting while carrying out a zooming operation, suitable parallax control in accordance with that change is performed.

According to the image processing device, the image processing method, the non-transitory tangible medium having the image processing program, and the image-pickup device of the embodiments of the technology, the parallax magnitude is modified for each of the plurality of parallax images with use of the shooting information related to the shooting condition for each of the parallax images. Thus, even on each of the parallax images obtained by changing the shooting condition in time-series such as animated images, suitable parallax control is performed in accordance with that change. Therefore, it is possible to perform the parallax control while maintaining a desired stereoscopic effect, in particular, for parallax images shot as animated images for three-dimensional viewing.

It is to be understood that both the foregoing general description and the following detailed description are exemplary, and are intended to provide further explanation of the technology as claimed.

Additional features and advantages are described herein, and will be apparent from the following Detailed Description and the figures.

DETAILED DESCRIPTION

Embodiments of the present application will be described below in detail with reference to the drawings.

1. First Embodiment (an example of a parallax control process based on shooting information and in which a binocular camera is used)

2. Second Embodiment (an example in which a monocular camera is used)

3. First Modification (an example of a parallax decreasing process)

4. Second Modification (an example in which only a focal length is used as shooting information)

1. First Embodiment

Overall Structure of Image-Pickup Device 1

Figure 1:
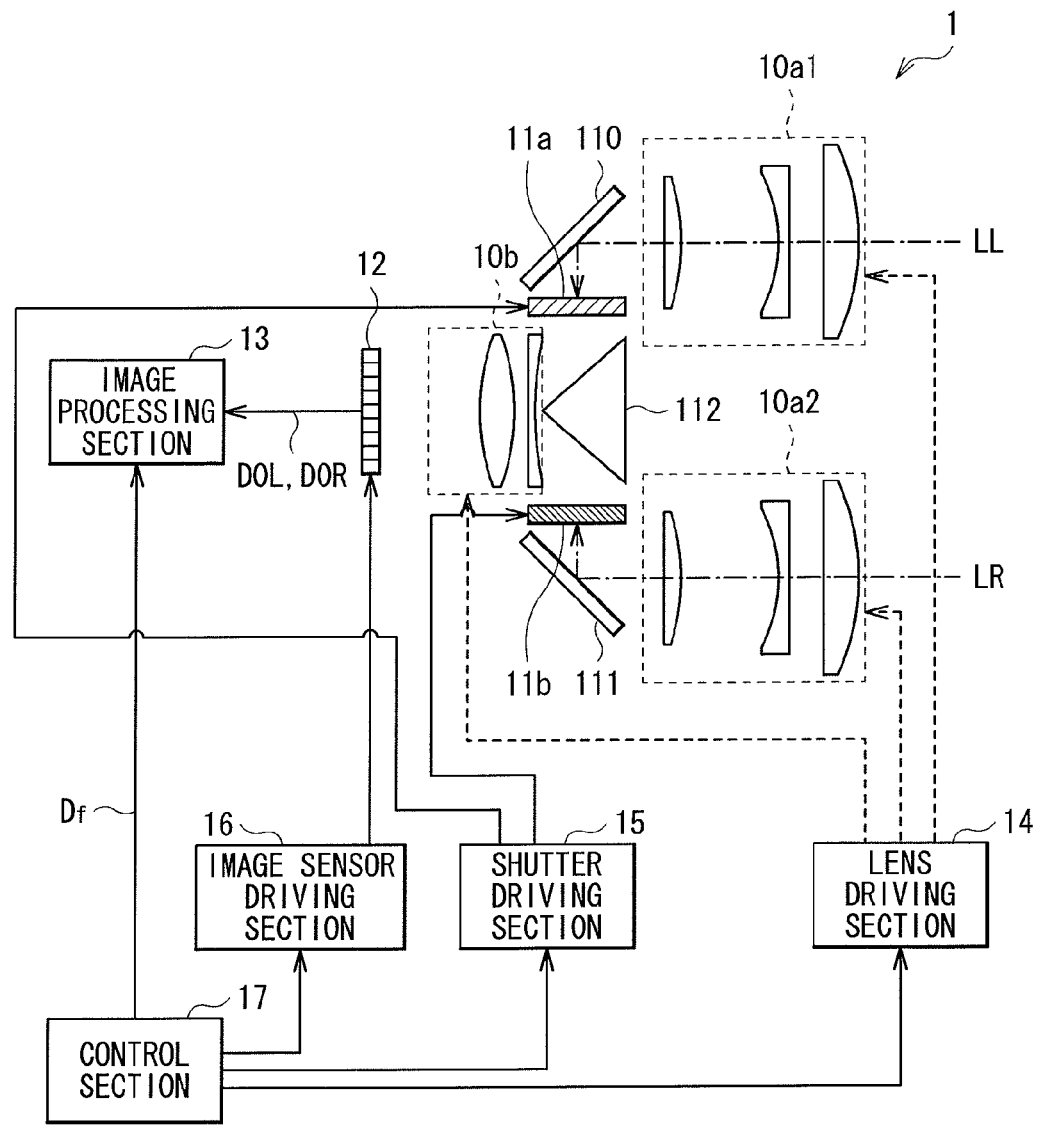
FIG. 1 shows an overall structure of an image-pickup device according to a first embodiment of the present disclosure.

FIG. 1 shows an overall structure of an image-pickup device according to a first embodiment of the present disclosure (the image-pickup device 1). The image-pickup device 1 shoots subjects from a plurality of view directions different from each other to obtain, in a time-series fashion, parallax images (left and right parallax images in the embodiment) as animated images (or static images). The image-pickup device 1 uses a so-called binocular camera, having image-pickup lenses 10a1 and 10b in one light path to receive a ray LL from a left view direction and image-pickup lenses 10a2 and 10b in the other light path to receive a ray LR from a right view direction. The image-pickup lens 10b is a common element for both light paths. The image-pickup device 1 also includes shutters 11a and 11b for each light path, and an image sensor 12 as a common element for both the light paths. The image-pickup device 1 further includes an image processing section 13, a lens driving section 14, a shutter driving section 15, an image sensor driving section 16, and a control section 17.

The image processing section 13 corresponds to an "image processing device" according to one embodiment of the present disclosure. An image processing program according to one embodiment of the present disclosure realizes, in a software fashion, each image processing function in the image processing section 13. In this case, the software is configured of a group of programs for allowing each image processing function to be executed by a computer. Each program may be used, for example, by incorporating the same in specified hardware in advance or by installing the same in an all-purpose personal computer or the like from an element such as a network and a recording medium.

The image-pickup lenses 10a1 and 10b are a group of lenses to receive a ray LL for a left view direction, and the image-pickup lenses 10a2 and 10b are a group of lenses to receive a ray LR for a right view direction. The shutter 11a is disposed between the image-pickup lenses 10a1 and 10b, and the shutter 11b is disposed between the image-pickup lenses 10a2 and 10b. Here, the arrangement of each of the shutters 11a and 11b is not limited thereto, but is preferably disposed at pupil planes of the image pickup lens groups or at an aperture (not shown).

The image-pickup lenses 10a1 and 10b (10a2 and 10b) function together as a so-called zoom lens. In the image-pickup lenses 10a1 and 10b (10a2 and 10b), a focal length is variable by adjusting a spacing between lenses or the like by the lens driving section 14. Also, each group of lenses is configured of one or more lenses. Information (such as a focal length and a subject distance) on a zooming operation of the image-pickup lenses 10a1 and 10b (10a2 and 10b) is inputted into the image processing section 13 via the control section 17 as shooting information Df.

A mirror 110 is disposed between the image-pickup lens 10a1 and the shutter 11a, a mirror 111 is disposed between the image-pickup lens 10a2 and the shutter 11b, and a mirror 112 is disposed between the shutters 11a and 11b. The mirrors 110, 111, and 112 enable the rays LL and LR to respectively enter the image-pickup lenses 10*b* after going through the shutters 11*a* and 11*b*.

The shutters 11*a* and 11*b* are respectively controlled to switch an open state (light transmission state) and a closed state (light blocking state) for each left and right light paths in order to pass or block light. The shutters 11*a* and 11*b* may be any element as long as the element can switch the light paths as described, such as mechanic shutters and electrical shutters including liquid crystal shutters.

The image sensor 12 is a photoelectric conversion element that outputs a light-reception signal based on the ray LL that passes through the image-pickup lenses 10*a*1 and 10*b* and the shutter 11*a*, or on the ray LR that passes through the image-pickup lenses 10*a*2 and 10*b* and the shutter 11*b*. For example, the image sensor 12 includes a plurality of photodiodes (light-reception pixels) disposed in a matrix, and may be an image-pickup element (such as Complementary Metal Oxide Semiconductor (CMOS)) of a rolling shutter type that reads out, in a line-sequential fashion, signals from the photodiodes. Further, color filters for red (R), green (G), and blue (B) having a predetermined color arrangement (not shown) may be disposed on a light-reception side of the image sensor 12, for example.

(Structure of Image Processing Section 13)

The image processing section 13 performs a predetermined image process on pickup images (left and right parallax images) based on image-pickup data from the image sensor 12. Also, the image processing section 13 includes a variety of memories for storing image-pickup data before or after processing an image. Alternatively, the processed image data may be outputted to an outside display or the like instead of storing.

Figure 2:
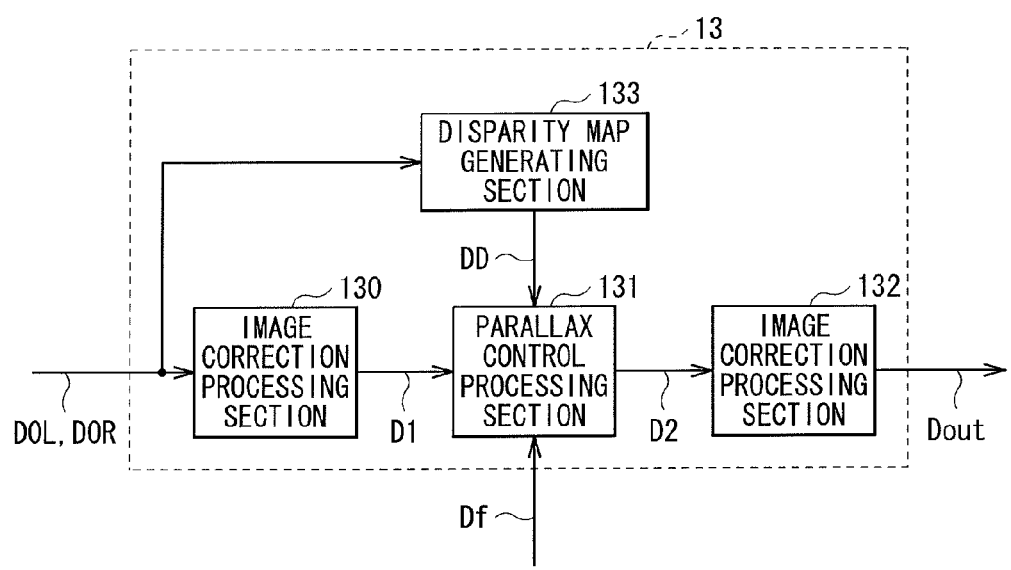
FIG. 2 is a functional block diagram showing a detailed structure of an image processing section shown in FIG. 1.

FIG. 2 shows a detailed structure of the image processing section 13. The image processing section 13 includes a parallax control processing section 131, a disparity map generating section 133, and image correction processing sections 130 and 132. The image correction processing sections 130 and 132 are respectively disposed on the before and after stages of the parallax control processing section 131. The parallax control processing section 131 performs modification control of a parallax magnitude on images (left parallax image L1 and right parallax image R1) that are based on image-pickup data (left parallax image data D0L and right parallax image data D0R) inputted from the image sensor 12.

The disparity map generating section 133 generates a so-called disparity map based on the image-pickup data (the left parallax image data D0L and the right parallax image data D0R). Concretely, the disparity map generating section 133 calculates disparity (i.e., such as phase difference and phase gap) between the left and the right parallax images for each pixel, to generate a map in which the calculated disparity is associated with each pixel. Although the disparity map may be generated and held for each pixel as described, it is also possible to obtain the disparity for each pixel block configured of a predetermined number of pixels, and hold the obtained disparity for each the pixel block. The disparity map generated by the disparity map generating section 133 is outputted to the parallax control processing section 131 as map data DD.

In the present embodiment, the parallax control processing section 131 performs modification control of modifying the parallax magnitude between the inputted left and the right parallax images to a desired parallax magnitude based on shooting information Df as described later. For example, parallax control may be suitably performed even when the parallax magnitude changes in accordance with shooting conditions of the zooming operation. A stereoscopic effect may be changed by modifying (increasing or decreasing) the parallax magnitude such that a subject image is observed to be nearer (on the side nearer to an observer) or to be deeper (on the side far from the observer). In particular, a parallax range may also be increased in addition to the parallax magnitude, by using the map data DD in modifying (increasing in the embodiment) the parallax magnitude.

As used herein, the term "parallax magnitude" refers to an amount of position difference (phase difference) in a horizontal direction in a screen or in an image. Also, the term "parallax range" refers to a dynamic range from an observation point that is the nearest to the observer to an observation point that is the farthest from the observer in a depth direction of the screen or the image.

The image correction processing section 130 performs correction processes such as a noise reduction and a demosaic process. The image correction processing section 132 performs a correction process such as a gamma correction process.

The lens driving section 14 is an actuator for changing a focal length by shifting a predetermined lens of the image-pickup lenses 10*a*1, 10*a*2, and 10*b* along an optical axis.

The shutter driving section 15 switches open and closed states of each shutter 11*a* and 11*b*. Concretely, the shutter driving section 15 drives the shutter 11*b* to be closed when the shutter 11*a* is opened, and drives the shutter 11*b* to be opened when the shutter 11*a* is closed. Also, the shutter driving section 15 drives the shutters 11*a* and 11*b* respectively such that the open and closed states are switched alternately in a time-divisional fashion for each of the shutters 11*a* and 11*b* in obtaining each parallax image as an animated image.

The image sensor driving section 16 drives the image sensor 12 and controls a light reception operation of the image sensor 12. For example, when the image sensor 12 is a CMOS image sensor of rolling shutter type as described above, the image sensor driving section 16 drives the image sensor 12 such that a light exposure and a signal read-out operations are each performed in a line-sequential fashion.

The control section 17 controls each operation of the image processing section 13, the lens driving section 14, the shutter driving section 15, and the image sensor driving section 16 in predetermined timing. For example, a micro computer or the like is used as the control section 17.

(Function and Effect of Image-Pickup Device 1)

(1. Basic Operation)

In the image-pickup device 1, the lens driving section 14 drives the image-pickup lenses 10*a*1 and 10*b* in accordance with the shooting conditions for the predetermined zooming operation, and the shutter driving section 15 switches the shutter 11*a* to be open and switches the shutter 11*b* to be closed based on the control by the control section 17. Also, in synchronization therewith, the image sensor driving section 16 drives the image sensor 12 to perform a light reception operation. Thereby, the left light path for the left view direction is selected (switched to the left light path), and the image sensor 12 receives light based on the ray LL of the incident rays from the subject to obtain the left parallax image data D0L.

Then, the lens driving section 14 drives the image-pickup lenses 10*a*2 and 10*b* in accordance with the shooting conditions for the predetermined zooming operation, and the shutter driving section 15 switches the shutter 11*b* to be open and switches the shutter 11*a* to be closed. Also, in synchronization therewith, the image sensor driving section 16 drives the image sensor 12 to perform the light reception operation. Thereby, the right light path for the right view direction is selected (switched to the right light path), and the image sensor 12 receives light based on the ray LR of the incident rays from the subject to obtain the right parallax image data D0R.

The shooting conditions in the zooming operation in acquiring each parallax image (such as a focal length f and a subject distance S) are inputted into the image processing section 13 (more specifically, the parallax control processing section 131) via the control section 17 as the shooting information Df.

By performing the switching driving of the image-pickup lenses 10a1 and 10a2 and the shutters 11a and 11b as described above alternately in a time-divisional fashion, image-pickup data corresponding to the left and the right parallax images respectively is obtained alternatively in time-series, and a pair of the left and the right parallax images is inputted sequentially into the image processing section 13.

The image processing section 13 performs a predetermined image process on the pickup images (left parallax image L1 and right parallax image R1 as described below) that are based on the left parallax image data D0L and the right parallax image data D0R obtained in a manner described above, and generates, for example, the left and the right parallax images (left parallax image L2 and right parallax image R2 as described below) for three-dimensional viewing. The generated left and the right parallax images L2 and R2 are stored in the image processing section 13 or outputted to the outside.

(Principle of obtaining Parallax Images)

Figure 3:
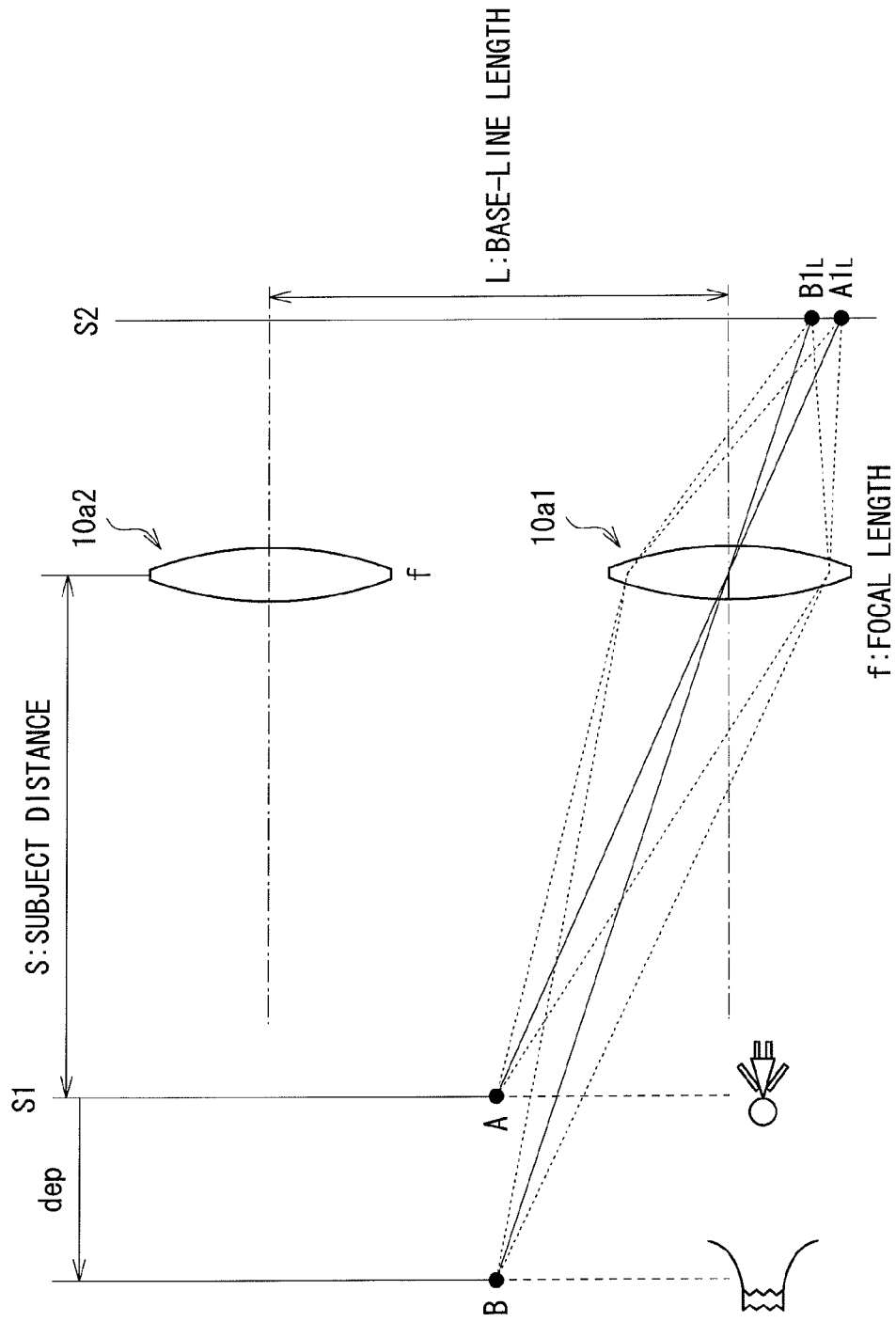
FIG. 3 is a schematic view to explain an image-forming position of a subject in obtaining a left parallax image by the image-pickup device shown in FIG. 1.
Figure 4:
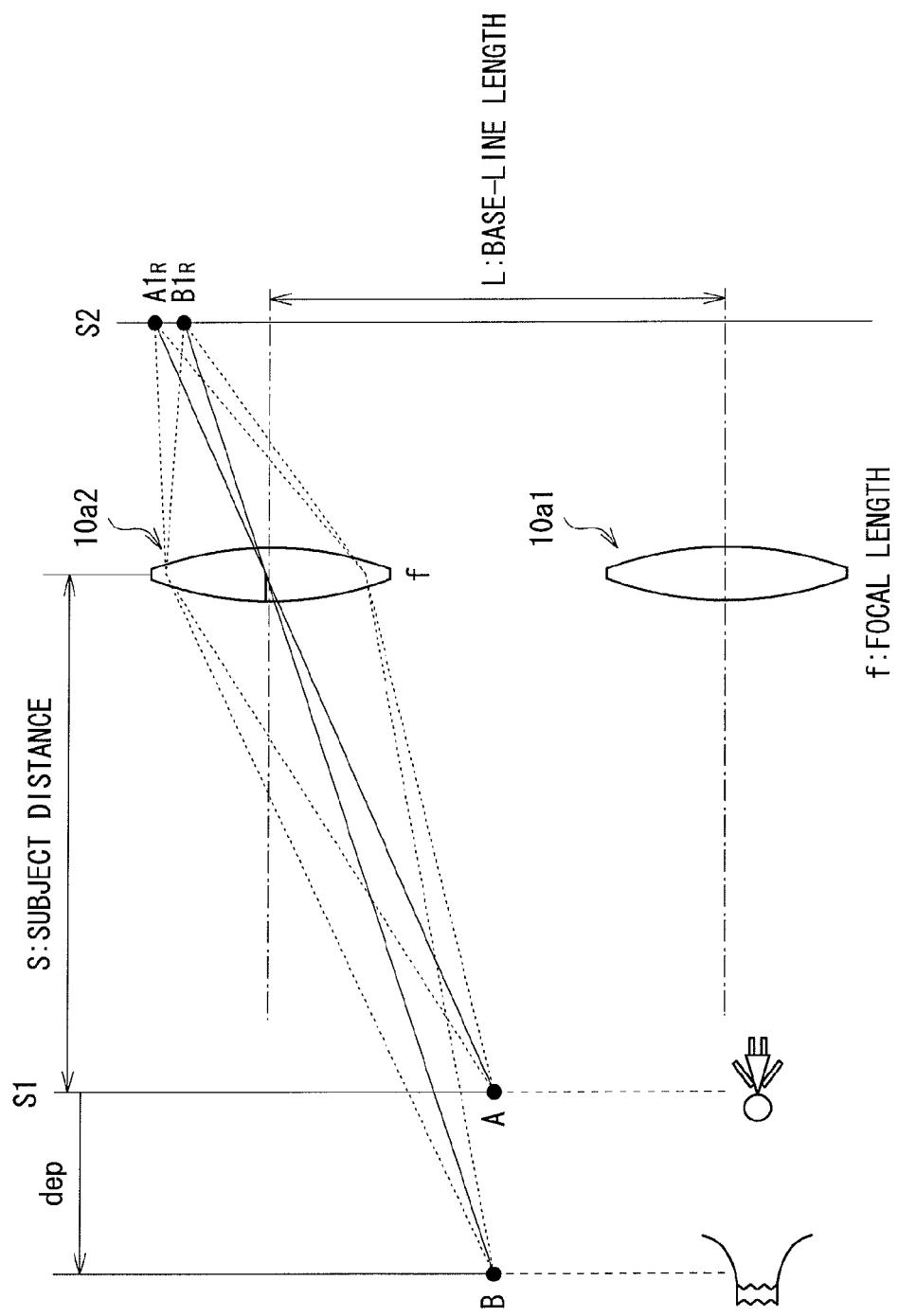
FIG. 4 is a schematic view to explain an imaging position of a subject in obtaining a right parallax image by the image-pickup device shown in FIG. 1.
Figure 5:
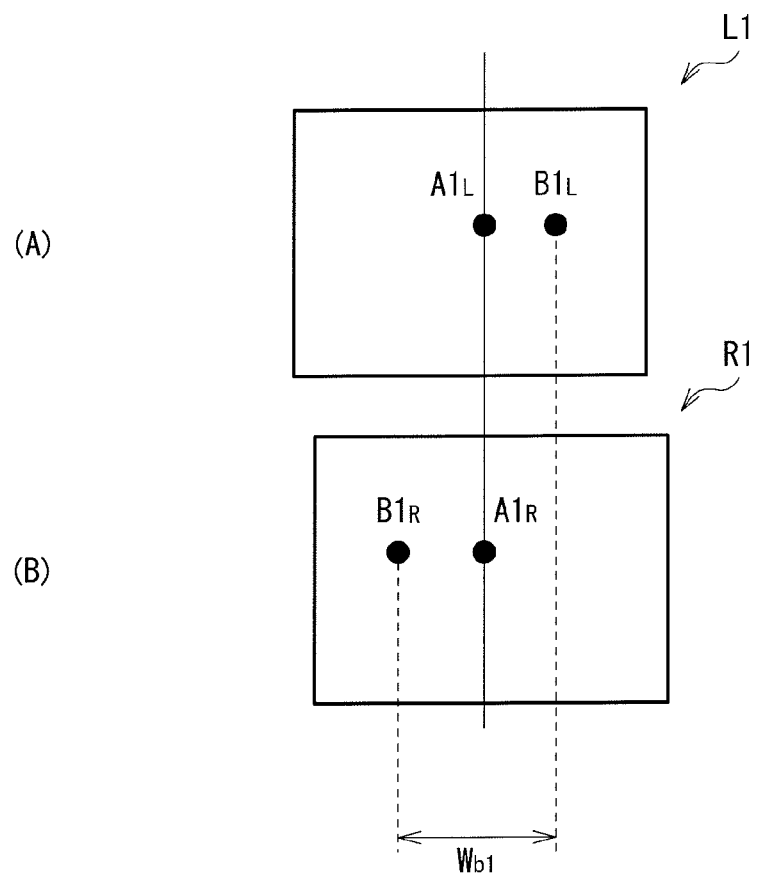
FIG. 5 is a schematic view to explain a parallax between left and right parallax images obtained by the image-pickup device shown in FIG. 1.

Referring now to FIGS. 3 to 5, a principle of obtaining the left and the right parallax images is described in detail. FIGS. 3 and 4 are equivalent to top views of the image-pickup device 1, and show rays from subjects to a sensor plane (light reception surface) S2 of the image sensor 12 without taking account of light path changes by a mirror or the like for simplicity. Also, showing of structure elements is omitted except for the image-pickup lenses 10a1 and 10a2, and the image-pickup lenses 10a1 and 10a2 are also simplified. FIGS. 3 and 4 illustrate an example where two subjects disposed at positions different from each other in the depth direction. Concretely, the two subjects are a subject A (person) which is in the focal plane S1 of the image-pickup lenses 10a1 and 10a2, and a subject B (mountain) which is at a position deeper (on the opposite side to the image-pickup lens) than that of the subject A.

(Left Parallax Image)

When the left and the right light paths are switched relative to the subjects A and B that are in such a positional relationship described above, those subjects A and B are imaged on the sensor plane S2 as follows. For example, when the left light path (the light path for passing an incident light to the image-pickup lens 10a1) corresponding to the left view direction is transmissible, the right light path corresponding to the right view direction is blocked as shown in FIG. 3. In this case, an image of the subject A is formed on the sensor plane S2 at a position $A1_L$ as an image focused thereon (be in focus), and an image of the subject B is formed on the sensor plane S2 at the position $B1_L$ as an image defocused thereon (dim). Here, description is given on the assumption that the centers of gravity in each the subject image are used for the imaging positions of the subjects (the same applies to the description hereinafter).

(Right Parallax Image)

On the other hand, when the right light path (the light path for passing an incident light to the image-pickup lens 10a2) corresponding to the right view direction is transmissible, the left light path is blocked as shown in FIG. 4. In this case, an image of the subject A is formed on the sensor plane S2 at the position $A1_R$ as an image focused thereon, and an image of the subject B is formed on the sensor plane S2 at the position $B1_R$ as an image defocused thereon.

(Parallax Between Left and Right Parallax Images)

In this way, in the image-pickup device 1, the left and the right parallax images are obtained by switching the two light paths corresponding to the left and the right view directions respectively. Also, in the thus-obtained left and the right parallax images L1 and R1, the defocused image (the image of the subject B) is located at a position that is shifted to the opposite direction to the focused image (the image of the subject A) in the horizontal direction mutually, as schematically shown in (A) and (B) of FIG. 5.

Then, by displaying the left and the right parallax images L2 and R2 that are based on the left and the right parallax images L1 and R1 respectively using a predetermined 3D display scheme such as a polarized light method, a frame sequential method, and a projector system, the observer is subjected to a stereoscopic effect corresponding to the parallax magnitude in the observation image as described below. It is to be noted that, at this time, the displaying is so performed that the positions $A1_L$ and $A1_R$ of the subject A are located at the same position (overlap) in the horizontal direction. Thereby, a positional shift (phase difference) is generated between the positions $B1_L$ and $B1_R$ of the subject B in the horizontal direction, and the positional shift causes the parallax for the left and the right. When the displaying is performed in this manner, the subject A (person) is observed on a display screen (on a reference plane) since there is no parallax, whereas the subject B (mountain) is observed with the stereoscopic effect corresponding to the parallax magnitude since there is the parallax as described above (in this example, the observer sees the subject B with the stereoscopic effect as if the subject B is located deeper than the reference plane).

(Relation Between Parallax Magnitude and Shooting Conditions)

In the image-pickup device 1 with the binocular camera, the parallax magnitude Wb1 of the subject B is equivalent to the distance between the positions $B1_L$ and $B1_R$ in the horizontal direction when the displaying is so performed as described that the subject A is observed on the reference plane. The parallax magnitude Wb1 can be defined as the following equation (1) by using the shooting conditions, where L is a base-line length (a distance between the optical axes of the image-pickup lenses 10a1 and 10a2), f is a focal length of the image-pickup lenses 10a1 and 10a2 (more specifically, the focal lengths between the image-pickup lenses 10a1 and 10b, and the image-pickup lenses 10a2 and 10b), S is a subject distance, and dep is a distance between the subjects A and B. Although an actual stereoscopic effect for the subject B is influenced by factors such as a display size and a distance between the observer and the display screen, a relative stereoscopic effect of the subject B relative to the subject A in the same screen is determined by the equation (1).

$$Wb1 = L \cdot \frac{dep}{(S+dep)} \cdot \frac{f}{(S-f)} \quad \text{Equation (1)}$$

(2. Parallax Control Process: Parallax Control Using Shooting Conditions)

In the present embodiment, the image processing section 13 performs the modification control of the parallax magnitude (increase in this case) between the left and the right parallax images L1 and R1 as described above. Concretely, in the image processing section 13, the image correction processing section 130 performs processes such as the noise reduction as described above on the left and the right parallax image data D0L and D0R inputted from the image sensor 12. Thereafter, the parallax control processing section 131 so controls the processed image data D1 (the left parallax image data D1L and the right parallax image data D1R) subjected to the image correction processing by the image correction processing section 130, that the parallax magnitude is increased to a desired amount by using the shooting information Df.

On the other hand, the disparity map generating section 133 generates, based on the inputted left and the right parallax image data D0L and D0R, the disparity map which is utilized when modifying the parallax magnitude and the parallax range described later. Concretely, the disparity map generating section 133 calculates, for each pixel, the disparity between the left and the right parallax images, to thereby generate the map in which the thus-calculated disparity is associated with each the pixel and held. Note that, as for the disparity map, although the respective disparities of the pixels are obtained and held as described above, it is also possible to obtain the disparity for each pixel block configured of a predetermined number of pixels and hold the thus-obtained disparity for each the pixel block. The disparity map generated by the disparity map generating section 133 is outputted to the parallax control processing section 131 as the map data DD.

Comparative Example

Here, a parallax control process according to a comparative example of the present embodiment is described. In the comparative example, when a parallax magnitude following the parallax control for the subject B is $Wb_{100}$, this parallax magnitude $Wb_{100}$ is expressed as the equation (2) by using a predetermined value $\alpha$. Wherein, the $\alpha$ is a fixed value set in advance (constant) for parallax modification control, or is a value set manually by the observer. Namely, in the comparative example, the modification control amount (for example, increase amount) of the parallax magnitude Wb1 of the subject B is uniquely set by the constant $\alpha$.

$$Wb_{100} = \alpha \cdot Wb1 = \alpha \cdot L \cdot \frac{dep}{(S+dep)} \cdot \frac{f}{(S-f)} \quad \text{Equation (2)}$$

However, when a plurality of subjects are shot, parallax magnitudes between the left and the right differ according to a case where a close subject is shot and a case where a far subject is shot. Also, the parallax magnitude is relatively large with a telescope condition, and is relatively small with a wide-angle condition for the same subject. Namely, when the shooting conditions such as the focal length and the subject distance change such as by the zooming operation, the parallax magnitude changes accordingly.

Thus, when animated images are shot while performing the zooming operation for example, the parallax magnitude changes in a time-series fashion even when it is the same subject. Hence, when the control is so performed as to modify the parallax magnitude uniquely (by a fixed modification control amount) for each parallax image configuring the animated image, the following may occur. Namely, when each parallax image following the modification control is displayed in animation, the parallax magnitude (a stereoscopic effect) is changed during that motion (zooming operation), and thus the observer is likely to sense an unnatural stereoscopic effect. For example, when the parallax magnitude of the animated image, which gradually zooms a subject in a zoom-up fashion, is increased by a fixed control amount, the observer may sense an insufficient closeness or an insufficient proximity when a subject image is located on the depth side, and on the contrary a projecting (popping-out) effect is increased more than necessary when the subject image is disposed on the front side. This may consequently cause an increased feeling of fatigue for the observer, or may cause the picture displaying to have insufficient reality or insufficient impact.

(Parallax Increasing Process that Takes Shooting Conditions into Consideration)

Therefore, in the present embodiment, the parallax control processing section 131 performs modification control of the parallax magnitude between each parallax image in consideration of the shooting conditions by the zooming operation. Concretely, the parallax magnitude is controlled to modify (increase) the same, based on the following equation (3) using the constant $\alpha$ used for the parallax modification as described and using the coefficient $\alpha$ (S, f) that includes parameters such as the subject distance S and the focal length f. Namely, the coefficient $\alpha$ (S, f) is so set that a parallax magnitude Wb2 is increased to a desired amount where the parallax magnitude following the modification control (the parallax magnitude between the output images) is Wb2.

For example, when the parallax magnitude is to be so increased that an amount of the parallax magnitude is not changed by the shooting conditions (such as the focal length f, for example), an equation expressed by the following (4) is used as the coefficient $\alpha$ (S, f). When substituting this into the equation (3), the equation (5) is obtained. By performing the parallax control based on the equation (5), the parallax magnitude Wb2 can be controlled (increased) regardless a magnitude of the focal length f. Namely, it is possible to suppress an unnatural change of the parallax magnitude (stereoscopic effect) during the zooming operation as described above, and to generate an image which is easy for the observer to see. It is to be noted, however, that the coefficient $\alpha$ (S, f) is not limited thereto, and may include other parameters selected in order to meet the desired parallax magnitude.

$$Wb2 = \alpha(S, f)Wb1 = \alpha(S, f) \cdot L \cdot \frac{dep}{(S+dep)} \cdot \frac{f}{(S-f)} \}m \quad \text{Equation (3)}$$

$$\alpha(S, f) = \alpha \frac{(S-f)}{f} \quad \text{Equation (4)}$$

$$Wb2 = \alpha \cdot L \cdot \frac{dep}{(S+dep)} \quad \text{Equation (5)}$$

Further, the parallax control processing section 131 shifts each position of the image (phase position, position of the center of gravity) of the subject B in the left and the right parallax images L1 and R1 in the horizontal direction, such that the parallax magnitude for the subject B is increased from Wb1 to the Wb2. Here, it is desirable that a process utilizing the disparity map be performed, as described below. It is to be noted that although the parallax control for the subject B is described here, same is true for other subjects. Namely, the coefficient $\alpha$ (S, f) is so set that the parallax magnitude, for each subject (here, for each subject B and C), becomes the desired amount.

(Parallax Increasing Operation utilizing Disparity Map)

Figure 6:
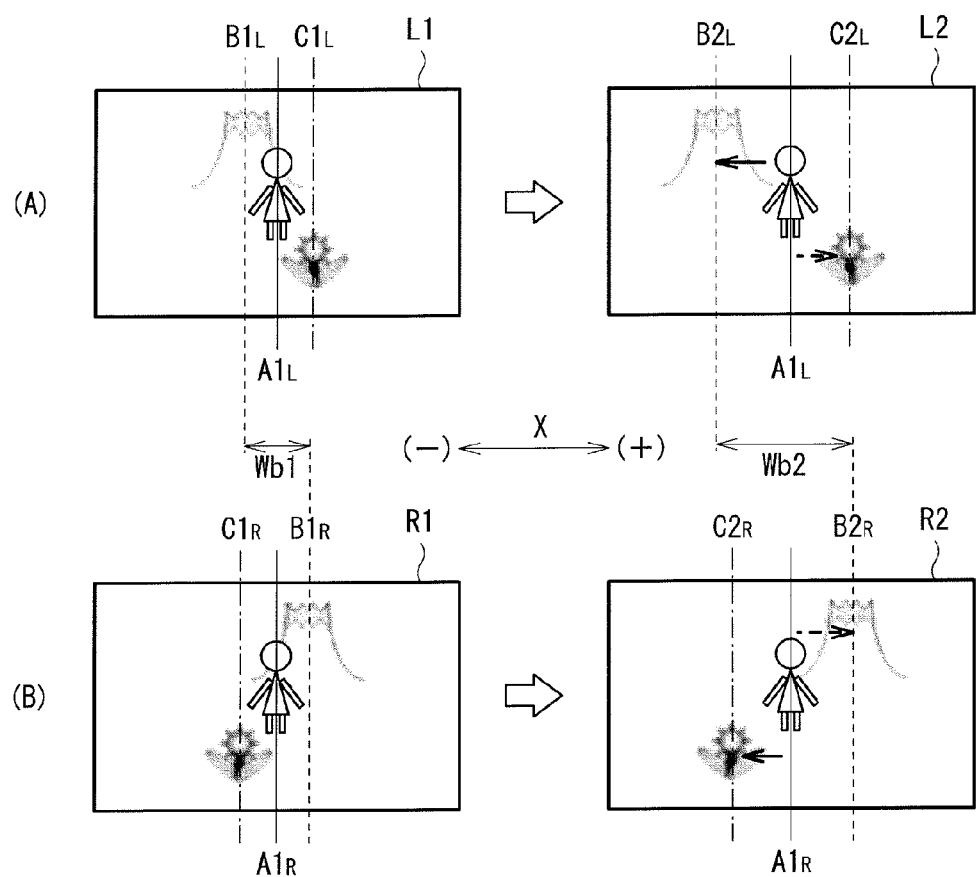
FIG. 6 is a schematic view to explain an example of a parallax control processing operation (parallax increasing process).

Moreover, in the present embodiment, the map data DD provided by the disparity map generating section 133 is used in performing the above-described parallax control process in which the shooting conditions are considered. In the following, the description will be made with reference to an example of parallax images, in which parallax images three subjects that are: a subject C (flower) located at a position nearer to the image-pickup lenses 10 than the subject A (located on the image-pickup lenses 10 side); the above-described subject A (person); and the subject B (mountain), are shot. Namely, as shown in (A) and (B) of FIG. 6, image positions of the subjects B and C are so shifted in the horizontal direction (X direction) in each of the left and the right parallax images L1 and R1, that the parallax magnitudes of the subjects B and C are increased. It is to be noted that, here, the positions A$1_L$ and A$1_R$ of the subject A having no parallax are not modified (not modified to maintain the parallax magnitude of 0 (zero)), and are disposed at the same positions respectively also in the left and the right parallax images L2 and R2.

Concretely, as for the subject B, the subject B is shifted in the X minus (−) direction (the solid arrow line) from the position B$1_L$ in the left parallax image L1 to the position B$2_L$ in the left parallax image L2. On the other hand, the subject B is shifted in the X plus (+) direction (the dotted arrow line) from the position B$1_R$ in the right parallax image R1 to the position B$2_R$ in the right parallax image R2. This makes it possible to increase the parallax magnitude for the subject B from the parallax magnitude Wb1 to the Wb2 that is set in consideration of the shooting conditions as described above. The parallax magnitude for the subject C is increased likewise as well. However, the subject C is shifted in the X plus (+) direction (the dotted arrow line) from the position C$1_L$ in the left parallax image L1 to the position C$2_L$ in the left parallax image L2. On the other hand, the subject C is shifted in the X minus (−) direction (the solid arrow line) from the position C$1_R$ in the right parallax image R1 to the position C$2_R$ in the right parallax image R2.

In this way, in the present embodiment, it is possible to control the parallax magnitudes to increase the same for each subject by using the disparity map. For example, it is possible to perform the parallax control performed on each subject, in which parallax control the positions of the specific subjects B and C among the subjects A to C may be shifted to mutually-different directions as described above to increase only the parallax magnitudes of the subjects B and C. It is also thereby possible to increase not only the parallax magnitudes in the horizontal direction but also the parallax range in the depth direction, as described below.

(Increase of Parallax Range)

Figure 7:
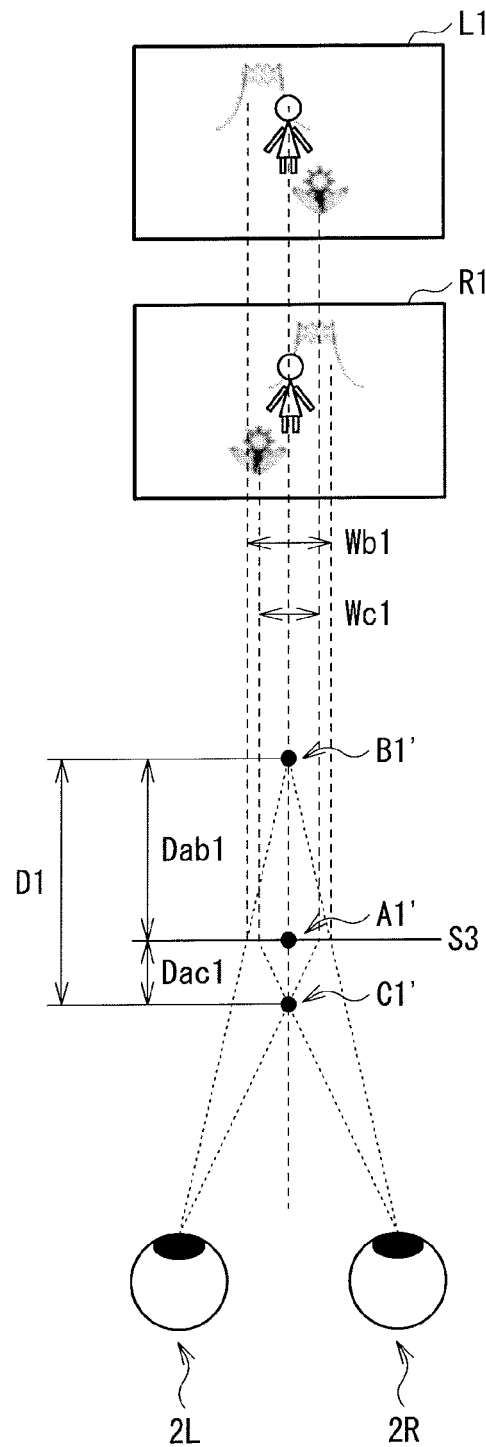
FIG. 7 is a schematic view showing a parallax magnitude and a parallax range in an image before performing a parallax control process.
Figure 8:
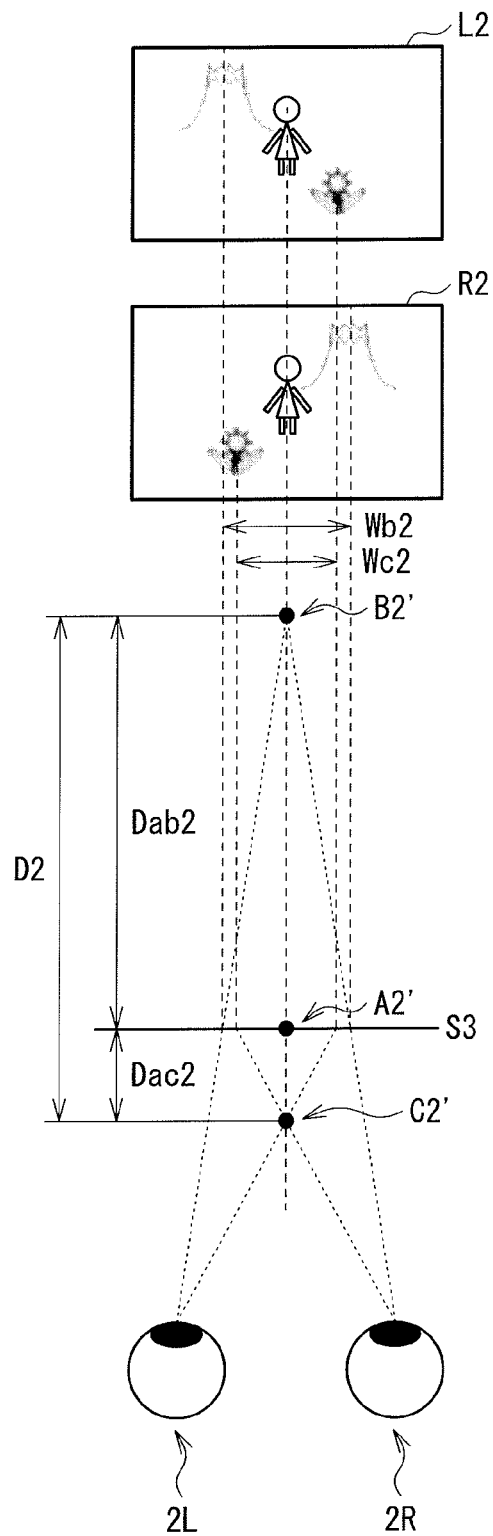
FIG. 8 is a schematic view showing the parallax magnitude and the parallax range in the image after performing the parallax control process.

FIG. 7 is a schematic view showing a parallax magnitude and a parallax range in the left and the right parallax images L1 and R1 that correspond to the left and the right parallax image data D0L and D0R respectively. FIG. 8 is a schematic view showing a parallax magnitude and a parallax range in the left and the right parallax images L2 and R2. As shown in FIG. 7, when the parallax magnitude of the subject B is the Wb1 and the parallax magnitude of the subject C is the Wc1 between the left and the right parallax images L1 and R1, observation positions of each image of the subjects A to C in the depth direction are as follows. Namely, the image of the subject A is observed at a position A1' on a display screen (a reference plane) S3; the image of the subject B is observed at a position B1' that is deeper than the subject A by the distance Dab1; and the image of the subject C is observed at a position C1' that is nearer than the subject A by the distance Dac1. Therefore, the parallax range between the left and the right parallax images L1 and R1 before the increasing control process of the parallax magnitude is the distance D1 that is a total of those distances Dab1 and Dac1.

When the increasing control process of the parallax magnitude as described above is performed, the parallax magnitude of the subject B becomes Wb2 and the parallax magnitude of the subject C becomes Wc2 between the left and the right parallax images L2 and R2, as shown in FIG. 8. Also, each observation position of the subjects A to C in the depth direction is changed as follows. Namely, the image of the subject A is observed at a position A2' (=A1') on the display screen (the reference plane) S3; the image of the subject B is observed at a position B2' that is deeper than the position A2' by the distance Dab2 (>Dab1); and the image of the subject C is observed at a position C2' that is nearer than the position A2' by the distance Dac2 (>Dac1). Therefore, the parallax range between the left and the right parallax images L2 and R2 following the increasing control process of the parallax magnitude is the distance D2 that is a total of those distances Dab2 and Dac2, and this parallax range D2 is increased more than the parallax range D1.

In this way, the using of the disparity map makes it possible to increase not only the parallax magnitude in the horizontal direction but also the parallax range in the depth direction. Thereby, it is possible to perform the parallax control in which, for example, the subject B disposed at a position deeper than the reference plane S3 is observed to be deeper and the subject C disposed at a position nearer than the reference plane S3 is observed to be projected or popped-out on the nearer side as described above, i.e., it is possible to perform the parallax control that further emphasizes each stereoscopic effect of each subject. In other words, it is possible to increase a sense of distance in the depth direction between the subjects B and C observed in a single screen. If the disparity map is not used, the phase shifts for the respective subjects (for each pixel or for each pixel block) as described above are not performed, so that the parallax range is not increased, and so that the respective subject images are consequently shifted while keeping the distance of each subject in the depth direction constant. In such a parallax control, it is only possible to shift all of the subject images collectively either toward the deeper side or toward the nearer side, and thus a change in the stereoscopic effect tends to be monotonous (lacks flexibility in the parallax control).

The left and the right parallax images L2 and R2 subjected to thus-performed parallax increasing process are inputted into the image correction processing section 132 as image data D2. The image correction processing section 132 performs a process such as the gamma correction process described above on the inputted image data D2, and then outputs the processed data to a memory section (not shown) or sends the same to a device such as an outside display device as image data Dout.

In this way, in the present embodiment, the process of controlling and increasing the parallax magnitudes is applied to the left and the right parallax images L1 and R1 using the shooting information Df related to the shooting conditions of the left and the right parallax images L1 and R1. This makes it possible to, even when the shooting conditions such as the focal length are changed as described above, perform the suitable parallax control that corresponds to those changes. Therefore, unlike the case where the modification control amount for the parallax magnitude is fixed, it is possible to perform the parallax control while maintaining a desired stereoscopic effect even for the parallax images shot as animated images for three-dimensional viewing.

2. Second Embodiment

Overall Structure of Image-Pickup Device 3

Figure 9:
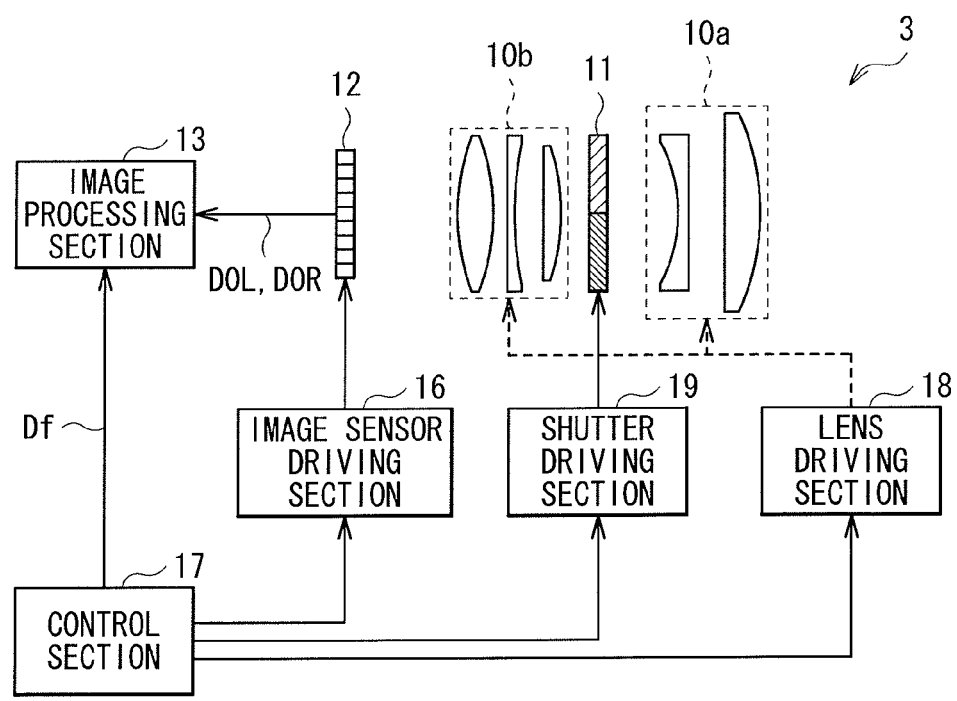
FIG. 9 shows an overall structure of an image-pickup device according to a second embodiment of the present disclosure.

FIG. 9 shows an overall structure of an image-pickup device according to a second embodiment of the present disclosure (the image-pickup device 3). As in the image-pickup device 1 according to the first embodiment, the image-pickup device 3 shoots subjects from a plurality of view directions (left and right directions in this embodiment) to obtain, in a time-series fashion, left and right parallax images as animated images (or static images). However, the image-pickup device 3 includes a so-called monocular camera, and is capable of switching each left and right light path by a shutter control. The image-pickup device 3 includes image-pickup lenses 10a and 10b, a shutter 11, the image sensor 12, the image processing section 13, a lens driving section 18, a shutter driving section 19, the image sensor driving section 16, and the control section 17. Note that the same or equivalent elements as those of the first embodiment described above are denoted with the same reference numerals, and will not be described in detail.

The image-pickup lenses 10a1 and 10b are a group of lenses to receive a ray from a subject. The shutter 11 is disposed between the image-pickup lenses 10a and 10b. Here, the arrangement of the shutter 11 is not limited thereto, but is preferably disposed at pupil planes of the image-pickup lenses 10a and 10b or at an aperture (not shown). The image-pickup lenses 10a and 10b function as so-called zoom lenses, and a focal length is variable by adjusting a spacing between lenses or the like by the lens driving section 18, as in the image-pickup lenses of the first embodiment. Information on the zooming operation of the image-pickup lenses 10a and 10b is inputted into the image processing section 13 via the control section 17 as shooting information Df.

The shutter 11 is divided into two regions of left and right regions. The shutter 11 controls to switch a transmission mode and a blocking mode for each of those divided regions. The shutter 11 may be any element as long as the element can switch open and closed states for each of the regions, such as a mechanical shutter and an electrical shutter including a liquid crystal shutter.

The image processing section 13 performs a predetermined image process on inputted left and right parallax images as in the first embodiment. The image processing section 13 includes the image correction processing sections 130 and 132, the parallax control processing section 131, and the disparity map generating section 133. The parallax control processing section 131 performs the modification control of the parallax magnitude on the left and the right parallax images L1 and R1. However, in the present embodiment, the parallax control processing section 131 of the image processing section 13 controls the parallax magnitude using shooting conditions in the monocular camera as will be described later in detail.

The lens driving section 18 is an actuator for shifting a predetermined lens in the image-pickup lenses 10a and 10b along an optical axis.

The shutter driving section 19 switches the open and closed states of each region of the shutter 11. Concretely, the shutter driving section 19 so drives the left and the right regions of the shutter 11, that the right region of the shutter 11 is closed when the left region is open, and that the right region is open when the left region is closed. The shutter driving section 19 so drives the left and the right regions in the shutter 11, that the open and closed states of each of the left and the right regions in the shutter 11 are switched alternately in a time-divisional fashion in shooting an animated image.

(Function and Effect of Image-Pickup Device 3)
(1. Basic Operation)

In the image-pickup device 3, the lens driving section 18 drives the image-pickup lenses 10a and 10b in accordance with the shooting conditions for the predetermined zooming operation, and the shutter driving section 19 switches the left region of the shutter 11 to be open and switches the right region to be closed based on control by the control section 17. Also, in synchronization therewith, the image sensor driving section 16 drives the image sensor 12 to perform the light reception operation. Thereby, the left light path is selected (or switched to the left light path), and the image sensor 12 obtains left parallax image data D0L based on an incident ray from a left view direction.

Then, the lens driving section 19 switches the right region of the shutter 11 to be open and switches the left region to be closed, and the image sensor driving section 16 drives the image sensor 12 to perform the light reception operation. Thereby, the right light path is selected (or switched to the right light path), and the image sensor 12 obtains right parallax image data D0R based on an incident ray from a right view direction.

As in the first embodiment, the shooting conditions in the zooming operation in acquiring each parallax image (such as the focal length f and the subject distance S) are inputted into the image processing section 13 (more specifically, the parallax control processing section 131) via the control section 17 as the shooting information Df.

By performing the switching driving for opening and closing the shutter 11 and the light reception operation of the image sensor 12 in a time-divisional fashion, image-pickup data corresponding to the left and the right parallax images respectively is obtained alternatively in time-series, and a pair of the image-pickup data is inputted sequentially into the image processing section 13.

The image processing section 13 performs a predetermined image process on the pickup images (the left parallax image L1 and the right parallax image R1) that are based on the left parallax image data D0L and the right parallax image data D0R obtained in a manner described above, and generates, for example, the left and the right parallax images L2 and R2 for three-dimensional viewing. The generated left and the right parallax images L2 and R2 are stored in the image processing section 13 or outputted to the outside.

(Principle of Obtaining Parallax Images)

Figure 10:
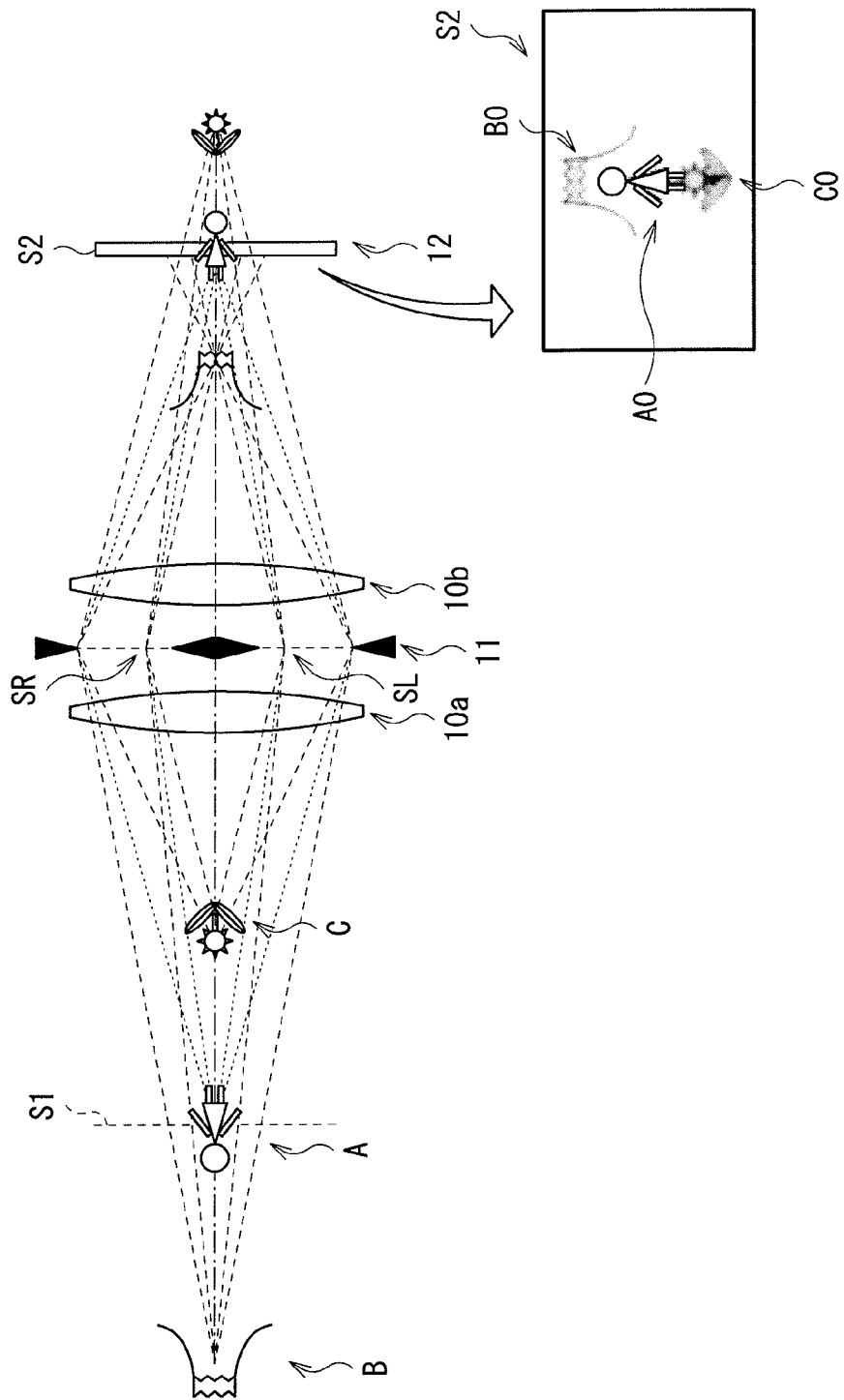
FIG. 10 is a schematic view to explain an image of received light in a 2D shooting (without switching light paths).
Figure 11:
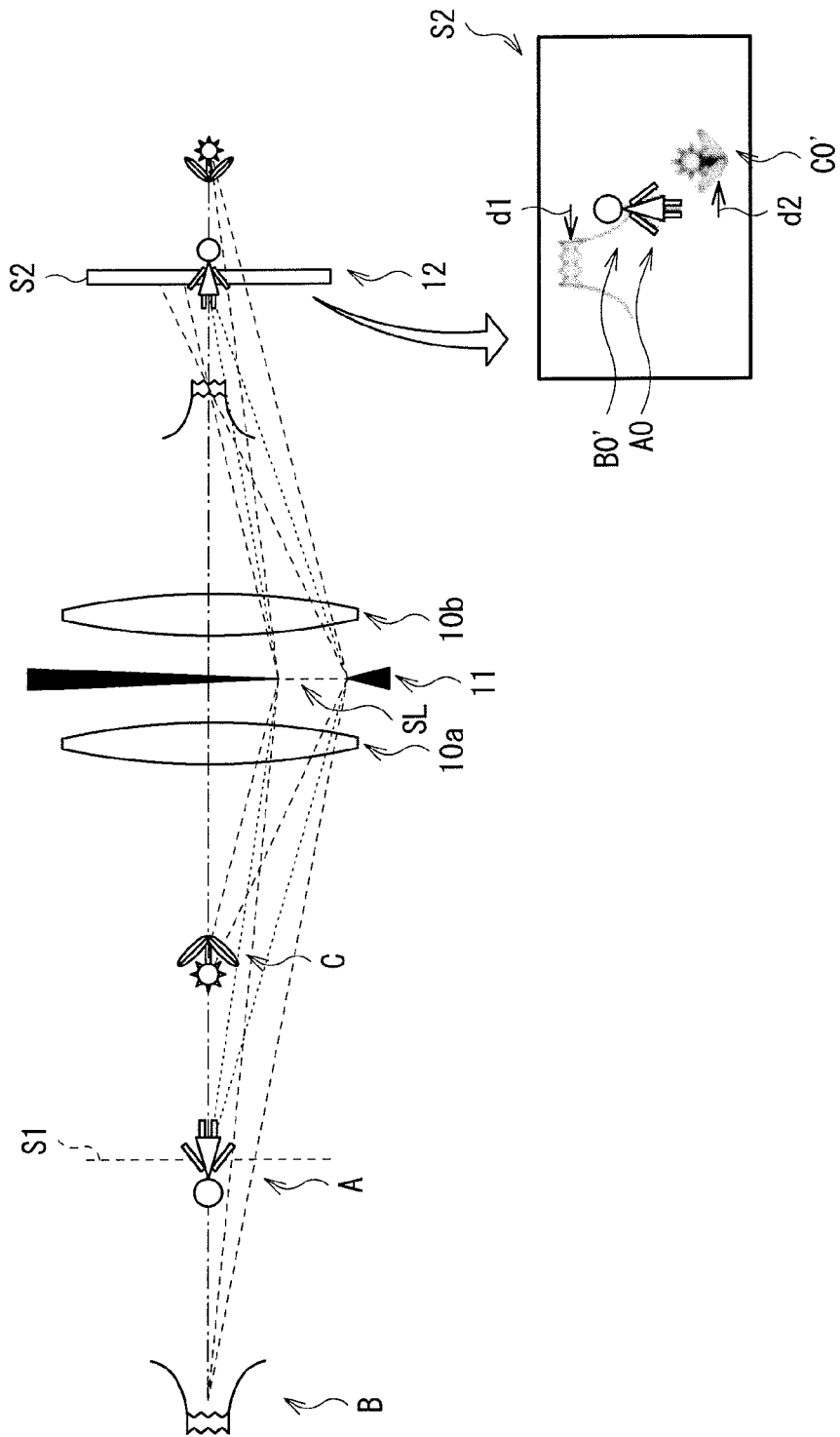
FIG. 11 is a schematic view to explain a principle to obtain a left parallax image by the image-pickup device shown in FIG. 9.
Figure 12:
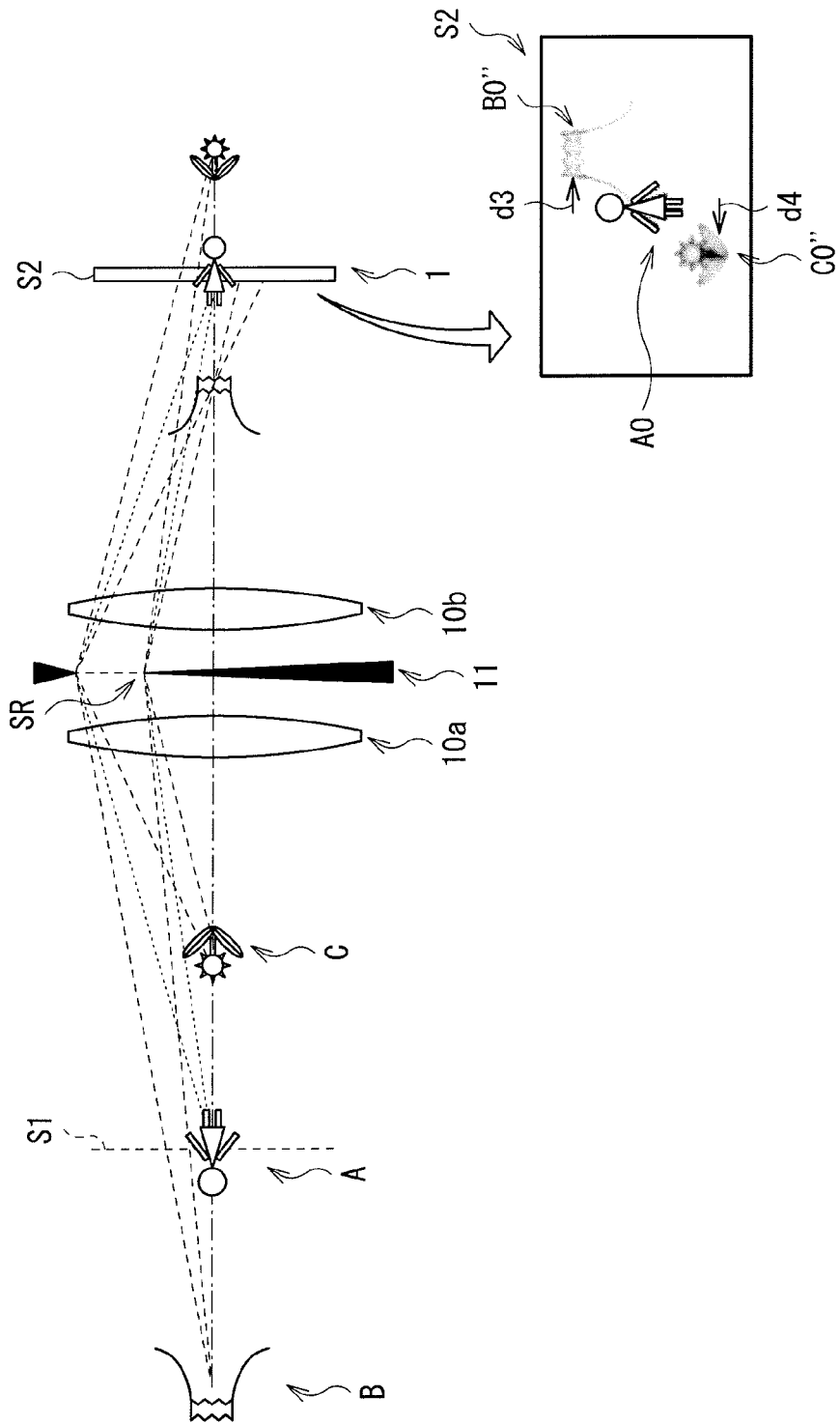
FIG. 12 is a schematic view to explain a principle to obtain a right parallax image by the image-pickup device shown in FIG. 9.
Figure 13:
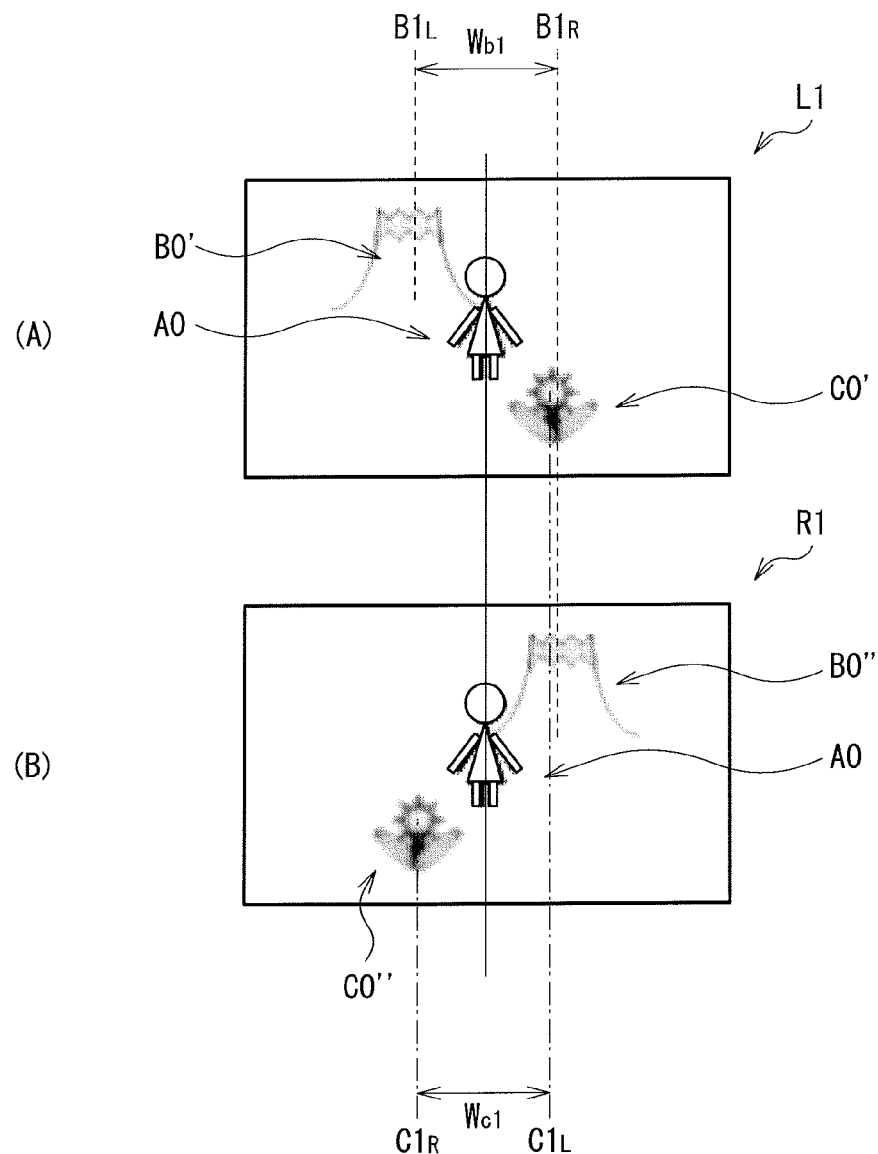
FIG. 13 is a schematic view to explain a parallax magnitude between left and right parallax images obtained by the image-pickup device shown in FIG. 9.

Referring now to FIGS. 10 to 12, a principle of obtaining the left and the right parallax images with a monocular camera is described. FIGS. 10 to 12 are equivalent to top views of the image-pickup device 3, and show only the image-pickup lenses 10a and 10b, the shutter 11, and the image sensor 12 for simplicity, and the image-pickup lenses 10a and 10b are also simplified.

First, description will be given on a light-reception image (appearance on the image sensor 12) when the left and the right light paths are not switched as shown in FIG. 10 (when shooting normal 2D images). In this embodiment, the description is given with reference to an example of three subjects (the subjects A to C described above) that are disposed at positions different from one another in the depth direction. As described before, the subject A (person) is disposed on the focal plane S1 of the image-pickup lenses 10a and 10b; the subject B (mountain) is disposed at a position deeper than the subject A; and the subject C (flower) is disposed at a position nearer than the subject A. In this case, an image of the subject A is formed on the sensor plane S2 in the vicinity of the center thereof, for example. On the other hand, an image of the subject B disposed at a position deeper than the focal plane S1 is formed at a position nearer (on the image-pickup lens 10b side) than the sensor plane S2, and an image of the subject C is formed at a position deeper than the sensor plane S2 (on the opposite side of the image-pickup lens 10b). Namely, the subject A appears on the sensor plane S2 as a focused (in focus) image (A0), and the subjects B and C appear on the sensor plane S2 as defocused (dim) images (B0 and C0).

(Left Parallax Image)

When the left and the right light paths are switched with respect to the subjects A to C that are in such a positional relationship described above, appearance of those on the sensor plane S2 changes as follows. For example, when the shutter driving section 19 drives the left region SL of the shutter 11 to be open and drives the right region SR to be closed, the left light path is transmissible and the right light path is blocked as shown in FIG. 11. In this case, even when the right light path is blocked, the image of the subject A on the focal plane S1 is still focused and imaged on the sensor plane S2 (A0) as in the case described above where there is no switching over of the light paths. However, as for the images of the subjects B and C that are out of the focal plane S1, the respective images thereof, that are defocused on the sensor plane S2, appear on the sensor plane S2 as images (B0', C0') that have moved to mutually-opposite directions (d1 and d2) in the horizontal direction.

(Right Parallax Image)

On the other hand, when the shutter driving section 19 drives the right region SR of the shutter 11 to be open and drives the left region SL to be closed, the right light path is transmissible and the left light path is blocked as shown in FIG. 12. In this case as well, the image of the subject A on the focal plane S1 is formed on the sensor plane S2, and the images of the subjects B and C that are out of the focal plane S1 appear on the sensor plane S2 as images (B0" and C0") that have moved to mutually-opposite directions (d3 and d4) in the sensor plane S2. It is to be noted that the movement directions d3 and d4 are reversed in direction to the movement directions d1 and d2 respectively in the left parallax image described above.

(Parallax between Left and Right Parallax Images)

Figure 14A:
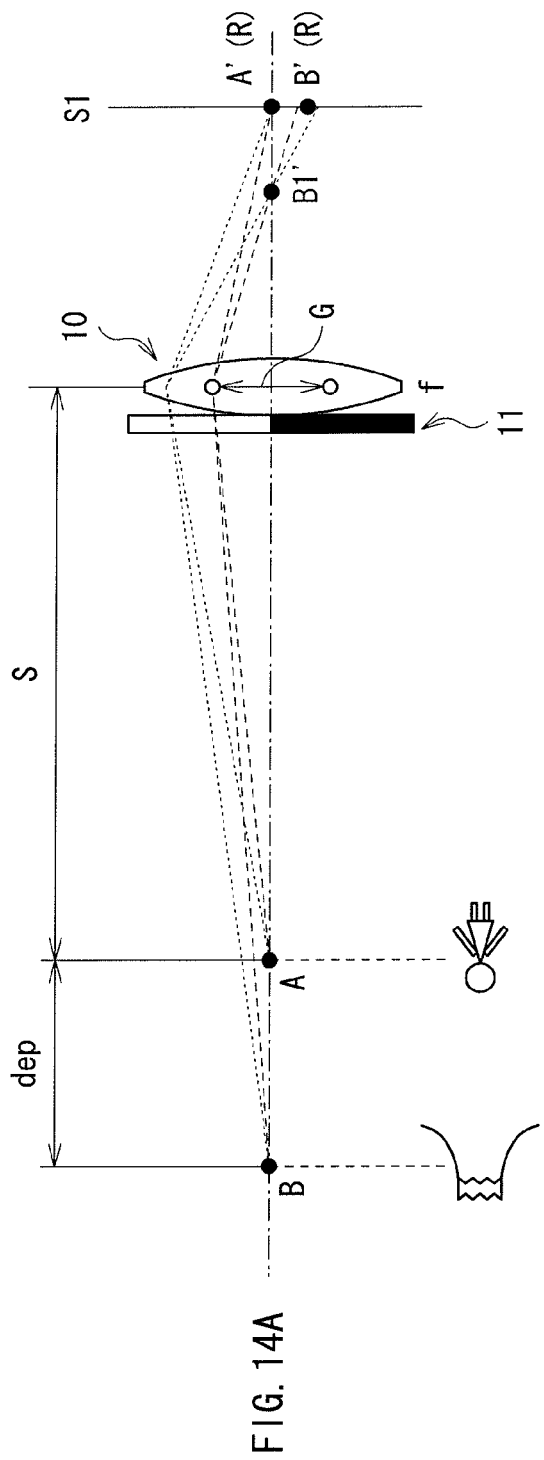
FIGS. 14A and 14B are schematic views to explain shooting conditions and a distance between the centers of gravity in the image-pickup device shown in FIG. 9.
Figure 14B:
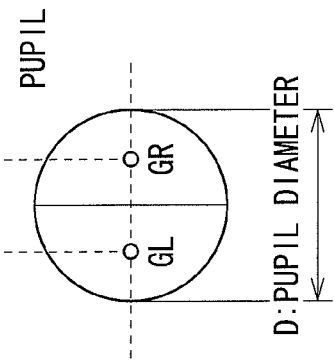

In this way, in the image-pickup device 3, the left and the right parallax images L1 and R1 are obtained by switching the open and closed states of the respective regions of the shutter 11 to thereby switch the light paths that correspond to the left and the right view directions respectively, as in the image-pickup device 1 of the first embodiment. Also, the defocused images of the subjects are shifted to the opposite directions with each other in the horizontal direction in the left and the right parallax images as described, and thus a position difference (a phase difference) in that horizontal direction is the parallax magnitude. For example, as shown in FIGS. 14A and 14B, as for the subject B, the position difference Wb1 in the horizontal direction between the position (B1$_L$) of the image B0' in the left parallax image L1 and the position (B1$_R$) of the image B0" in the right parallax image R1 is the parallax magnitude of the subject B. Similarly, as for the subject C, the position difference Wc1 in the horizontal direction between the position (C1$_L$) of the image C0' in the left parallax image L1 and the position (C1$_R$) of the image C0" in the right parallax image R1 is the parallax magnitude of the subject C.

Therefore, in the present embodiment, by displaying the left and the right parallax images using a predetermined 3D display scheme, the observer is subjected to a stereoscopic effect corresponding to the parallax magnitude of each of the subject images in the observation image. For example, in the above described example, the subject A (person) having no parallax is observed on the display screen (on the reference plane), whereas the subject B (mountain) is observed to be deeper than the reference plane, and the subject C (flower) is observed with the stereoscopic effect as if the subject C is projected or popped-out from the reference plane.

(Relation Between Parallax Magnitude and Shooting Conditions)

Here, as to the parallax magnitude Wb1 of the subject B between the left and the right parallax images L1 and R1, the parallax magnitude Wb1 is defined as the following equation (6) using the shooting conditions, in the image-pickup device 3 having the monocular camera, where f is a focal length of the image-pickup lenses 10a and 10b, S is a subject distance, and dep is a distance between the subjects A and B as shown in FIG. 14A, and where G is a distance between the centers GL and GR of gravity of each left and right region on a pupil plane (a distance between the centers of gravity), and D is a pupil diameter as shown in FIG. 14B. In this way, in the present embodiment (with the monocular camera) as well, the parallax magnitude Wb1 is expressed by a similar equation that uses the shooting conditions as the first embodiment (with the binocular camera), which is equivalent to the equation (1) that replaces the base-line length L with the distance between the centers of gravity G. Also, the actual relative stereoscopic effect of the subject B to the subject A is determined by the equation (6).

$$Wb1 = G \cdot \frac{dep}{(S + dep)} \cdot \frac{f}{(S - f)} \quad \text{Equation (6)}$$

(2. Parallax Control Process)

In the present embodiment, the image processing section 13 performs the modification control of the parallax magnitude between the left and the right parallax images L1 and R1 as in the first embodiment. Concretely, the parallax control processing section 131 of the image processing section 13 controls to increase the parallax magnitude and the parallax range for the left and the right parallax images L1 and R1 using the shooting information Df.

(Parallax Increasing Process that Takes Shooting Conditions into Consideration)

In the present embodiment as well, the parallax control processing section 131 performs the modification control of the parallax magnitude between each parallax image in consideration of the shooting conditions by the zooming operation as described above. Concretely, the parallax magnitude is controlled to increase the same, based on the following equation (7) using the coefficient α (S, f) that includes parameters such as the focal length f and the subject distance S. Namely, for example, as to the subject B, the coefficient α (S, f) is so set that the parallax magnitude Wb2 following the increasing control becomes a desired amount. Here, when the parallax magnitude is to be so increased that an amount of the parallax magnitude is not changed by the shooting conditions, the equation expressed by the equation (4) can be used for the coefficient α (S, f), as in the first embodiment described above. Thereby, in this embodiment as well, it is possible to suppress the unnatural change of the parallax magnitude (stereoscopic effect) during the zooming operation as described above. It is to be noted that the distance between the centers of gravity G is expressed as the following equation (8) using the pupil diameter D. Further, since the pupil diameter D is expressed using the focal length f and the F number F, the distance G may also be expressed as the equation (9). Namely, factors such as the pupil diameter D and F number F may be used as parameters, other than the focal length f and the subject distance S.

$$Wb2 = \alpha(S, f) \cdot G \cdot \frac{dep}{(S + dep)} \cdot \frac{f}{(S - f)} \quad \text{Equation (7)}$$

$$G = \frac{4}{3\pi} D \quad \text{Equation (8)}$$

$$G = \frac{4}{3\pi} D = \frac{4}{3\pi} \cdot \frac{f}{F} \quad \text{Equation (9)}$$

(Utilization of Disparity Map)

Also, in the parallax control process, it is possible to increase, for each subject, the parallax magnitude thereof by using the map data DD as in the first embodiment. It is also thereby possible to increase not only the parallax magnitude in the horizontal direction but also the parallax range in the depth direction. Therefore, as in the first embodiment described above, it is possible to perform the parallax control in which, for example, the subject B disposed at a deeper position is observed to be deeper and the subject C disposed at a nearer position is observed to be further projected or popped-out, i.e., it is possible to perform the parallax control that further emphasizes the stereoscopic effect for each subject.

The left and the right parallax images L2 and R2 following the thus-performed parallax increasing process are applied with a predetermined image correction process by the image correction processing section 132, following which the resultant is then outputted as the image data Dout to the memory section (not shown) or to a device such as an outside display device.

In this way, in the present embodiment as well, the increasing control of the parallax magnitudes is performed on the left and the right parallax images L1 and R1 using the shooting information Df related to the shooting conditions of the left and the right parallax images L1 and R1. This makes it possible to, even when the shooting conditions are changed, perform the suitable parallax control of the parallax magnitude that corresponds to those changes. Therefore, it is possible to achieve effects that are similar to those according to the first embodiment described above.

In the following, modifications (first modification and second modification) of the image-pickup devices according to the first and the second embodiments will be described. Note that the same or equivalent elements as those of the first and the second embodiments described above are denoted with the same reference numerals, and will not be described in detail.

First Modification

Figure 15:
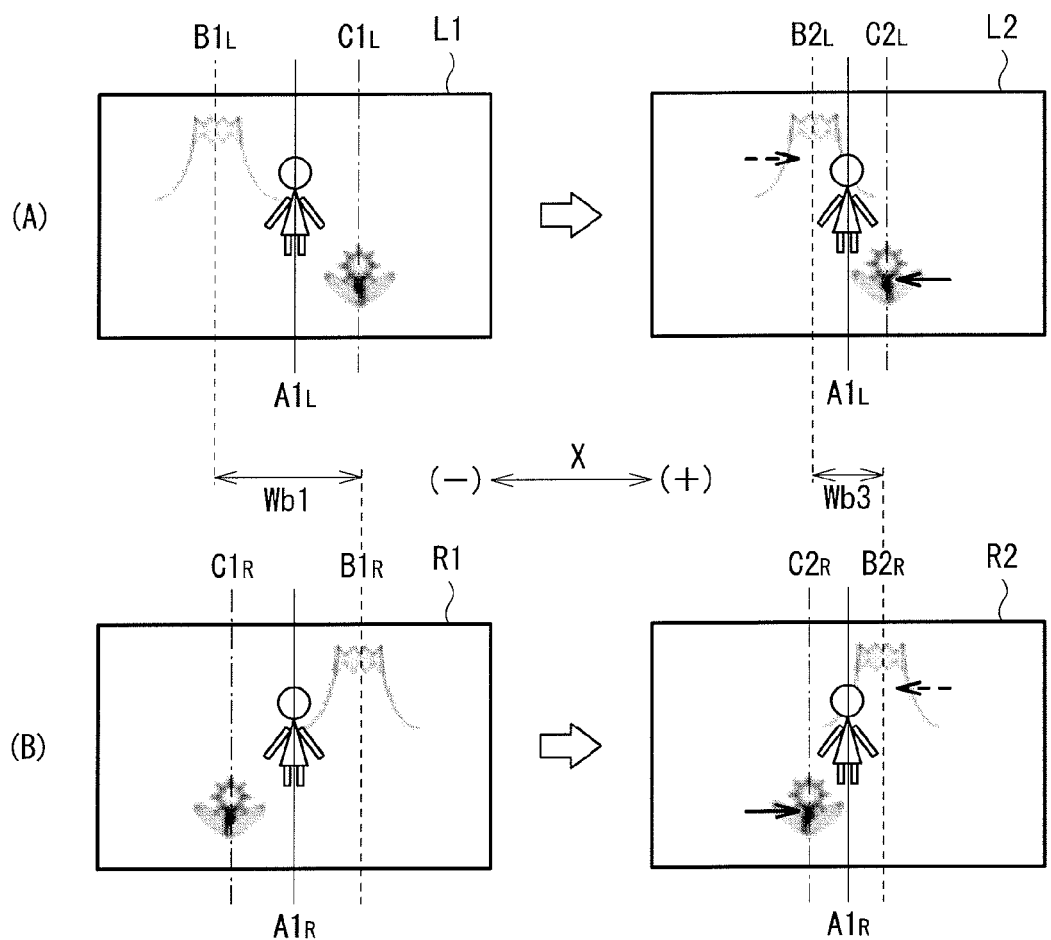
FIG. 15 is a schematic view to explain a parallax control process (parallax decreasing process) according to a first modification.

Although the first and the second embodiments have been described with reference to the increasing control process as an example of the modification control processes of the parallax magnitudes, the modification control of decreasing the parallax magnitude may be performed. Namely, the disparity map may be utilized at the time of performing the parallax control that uses the shooting information Df, to perform the following decreasing control on the left and the right parallax images L1 and R1 that are obtained in a manner described above. In other words, as shown in (A) and (B) of FIG. 15, positions of images of the subjects B and C are so shifted in the horizontal direction (X direction) that the respective parallax magnitudes of the subjects B and C in the left and the right parallax images L1 and R1 are decreased. It is to be noted that, in this case as well, the positions $A1_L$ and $A1_R$ of the subject A having no parallax are not modified (not modified to maintain the parallax magnitude of 0 (zero)), and are disposed at the same positions respectively also in the left and the right parallax images L2 and R2.

Concretely, as for the subject B, the subject B is shifted in the X plus (+) direction (the dotted arrow line) from the position $B1_L$ in the left parallax image L1 to the position $B2_L$ in the left parallax image L2. On the other hand, the subject B is shifted in the X minus (−) direction (the solid arrow line) from the position $B1_R$ in the right parallax image R1 to the position $B2_R$ in the right parallax image R2. This makes it possible to decrease the parallax magnitude of the subject B from the parallax magnitude Wb1 to the parallax magnitude Wb3 that is smaller than the parallax magnitude Wb1. In the modification as well, the parallax magnitude Wb3 is set using the shooting information Df (such as the focal length f and the subject distance S). The parallax magnitude for the subject C is decreased likewise as well. However, the subject C is shifted in the X minus (−) direction (the solid arrow line) from the position $C1_L$ in the left parallax image L1 to the position $C2_L$ in the left parallax image L2. On the other hand, the subject C is shifted in the X plus (+) direction (the dotted arrow line) from the position $C1_R$ in the right parallax image R1 to the position $C2_R$ in the right parallax image R2.

In this way, in the present modification, it is possible to control the parallax magnitudes to decrease the same for each subject by using the disparity map. For example, it is possible to perform the parallax control performed on each subject, in which parallax control the positions of the specific subjects B and C among the subjects A to C may be shifted to mutually-different directions as described above to decrease only the parallax magnitudes of the subjects B and C. It is also thereby possible to decrease not only the parallax magnitudes in the horizontal direction but also the parallax range in the depth direction for the reasons similar to those described above. Therefore, it is possible to allow the subject images, observed deeper from the standard surface and nearer to the observer, to be observed to be nearer to the reference plane, i.e., to moderate the stereoscopic effect for each subject.

Second Modification

Also, in the first and the second embodiments, although the parallax control is performed using the focal length f and the subject distance S as the shooting information Df and those S and f are used for the coefficient α (S, f) as parameters, the parameters used as the shooting information Df are not limited thereto. For example, other parameters may be used as the shooting information Df as described above, or only the focal length f may be used as in the present modification.

Namely, the parallax magnitude Wb2 can be expressed as the following equation (10) in consideration of the fact that S is much larger than f (S>>f) within an range in which in-focus is achieved in an ordinary camera. Therefore, when the parallax magnitude is to be so modified (increased or decreased) that an amount of the parallax magnitude is not changed by the shooting conditions as in the first and the second embodiments described above, an equation expressed by the following (11) may be used as the coefficient α (S, f). This makes it possible to suppress the unnatural change of the parallax magnitude (stereoscopic effect) during the zooming operation, as in the first and the second embodiments described above.

$$Wb2 = \alpha(S, f) \cdot L \cdot \frac{dep}{(S+dep)} \cdot \frac{f}{S} \} n \quad \text{Equation (10)}$$

$$\alpha(S, f) = \alpha \frac{1}{f} \quad \text{Equation (11)}$$

Although the technology has been described in the foregoing by way of example with reference to the embodiments and the modifications, the technology is not limited thereto but may be modified in a wide variety of ways. For example, in the embodiments and the modifications, the predetermined image processes are applied to the left and the right parallax images obtained by switching the left and the right light paths. However, the view directions are not limited to the left and the right directions (a horizontal direction), and may be up and down directions (a perpendicular direction). Moreover, three or more light paths may be switched to obtain three or more parallax images.

Also, in the embodiments and the modifications, the shooting information Df is obtained by the image processing section 13 from the image-pickup lenses side via the control section 17. Alternatively, the following methods may be employed when an image process including the parallax control process is executed in a device provided separately from a camera body (including the image-pickup lens and the image sensor). That is, the shooting information Df may be obtained directly from the camera body, or may be stored as pixel data of a pixel in each parallax image (for example, a pixel that usually does not affect image displaying and is disposed at a corner in the image sensor). Moreover, the shooting information Df may be held in a header of a line memory in order to perform the parallax control process in an occasion except for shooting images.

Moreover, in the embodiments and the modifications, the parallax is so controlled that the subject B disposed at a position deeper than the subject A is observed to be deeper and the subject C disposed nearer than the subject A is observed to be nearer (or vice versa), i.e., so controlled that the stereoscopic effects for the respective subject are emphasized (or mitigated), although it is not limited thereto. The parallax may be so controlled that various parallax images are obtained according to desired stereoscopic effects. Also, in the embodiments and the modifications, an image position of the subject A is not shifted from a reference position. Alternatively, the subject A may be so shifted that the subject A is also observed on the deeper side from the reference plane (or on the nearer side to the observer). Moreover, the number of subjects for which the parallax magnitude is controlled are not limited to three as described above, and the number of subjects may be less or more than three.

Also, a series of image processes by the image processing section 13 may be executed in a hardware or a software or a combination thereof. When a process is executed by a software, a program storing process sequence may be installed in a memory of a computer incorporated in a specific hardware to allow the same to be executed, or the program may be installed in a device such as a wide-use computer that performs various processes to allow the same to be executed. For example, the program may be stored in advance in a recording medium. Other than installing the same from the recording medium to the computer, the program may be received via a network such as a LAN (Local Area Network) and the Internet to install the same into a recording medium such as a built-in hard disk.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An image processing device comprising:
   a phase difference detection section detecting, on each of a plurality of parallax images obtained through shooting from a plurality of respective view point directions different from one another, a phase difference between the parallax images as a measured parallax magnitude, the measured parallax magnitude being a function of a focal length of an image-pickup lens and a subject distance; and
   a parallax control processing section performing an image processing for modifying the previously measured parallax magnitude, a parallax magnitude adjustment factor being based on the focal length of the image-pickup lens and the subject distance,
   wherein the parallax magnitude adjustment factor is set such that any changes in the measured parallax magnitude that are due to either a change in the focal length of the image-pickup lens or a change in the subject distance are eliminated.

2. The device according to claim 1, wherein the parallax control processing section allows the parallax magnitude between the parallax images in a horizontal direction to increase or decrease, based on the phase difference detected by the phase difference detection section.

3. The device according to claim 1, wherein the phase difference detection section detects the phase difference for each of pixels or for each of pixel blocks each including a plurality of pixels, and generates a disparity map holding the detected phase difference for each of the pixels or each of the pixel blocks.

4. The device according to claim 3, the parallax control processing section allows the parallax magnitude between the parallax images in a depth direction to increase or decrease, based on the disparity map generated by the phase difference detection section.

5. An image processing method comprising:
   detecting, on each of a plurality of parallax images obtained through shooting from a plurality of respective view point directions different from one another, a phase difference between the parallax images as a measured parallax magnitude, the measured parallax magnitude being a function of a focal length of an image-pickup lens and a subject distance; and
   performing an image processing for modifying the previously measured parallax magnitude, a parallax magnitude adjustment factor being based on the focal length of the image-pickup lens and the subject distance,
   wherein the parallax magnitude adjustment factor is set such that any changes in the measured parallax magnitude that are due to either a change in the focal length of the image-pickup lens or a change in the subject distance are eliminated.

6. A non-transitory computer-readable medium having a stored computer program, which when executed by at least one processor, cause the at least one processor to:

detect, on each of a plurality of parallax images obtained through shooting from a plurality of respective view point directions different from one another, a phase difference between the parallax images as a measured parallax magnitude, the measured parallax magnitude being a function of a focal length of an image-pickup lens and a subject distance; and perform an image processing for modifying the previously measured parallax magnitude, a parallax magnitude adjustment factor being based on the focal length of the image-pickup lens and the subject distance, wherein the parallax magnitude adjustment factor is set such that any changes in the measured parallax magnitude that are due to either a change in the focal length of the image-pickup lens or a change in the subject distance are eliminated.

* * * * *